UNITED STATES PATENT OFFICE.

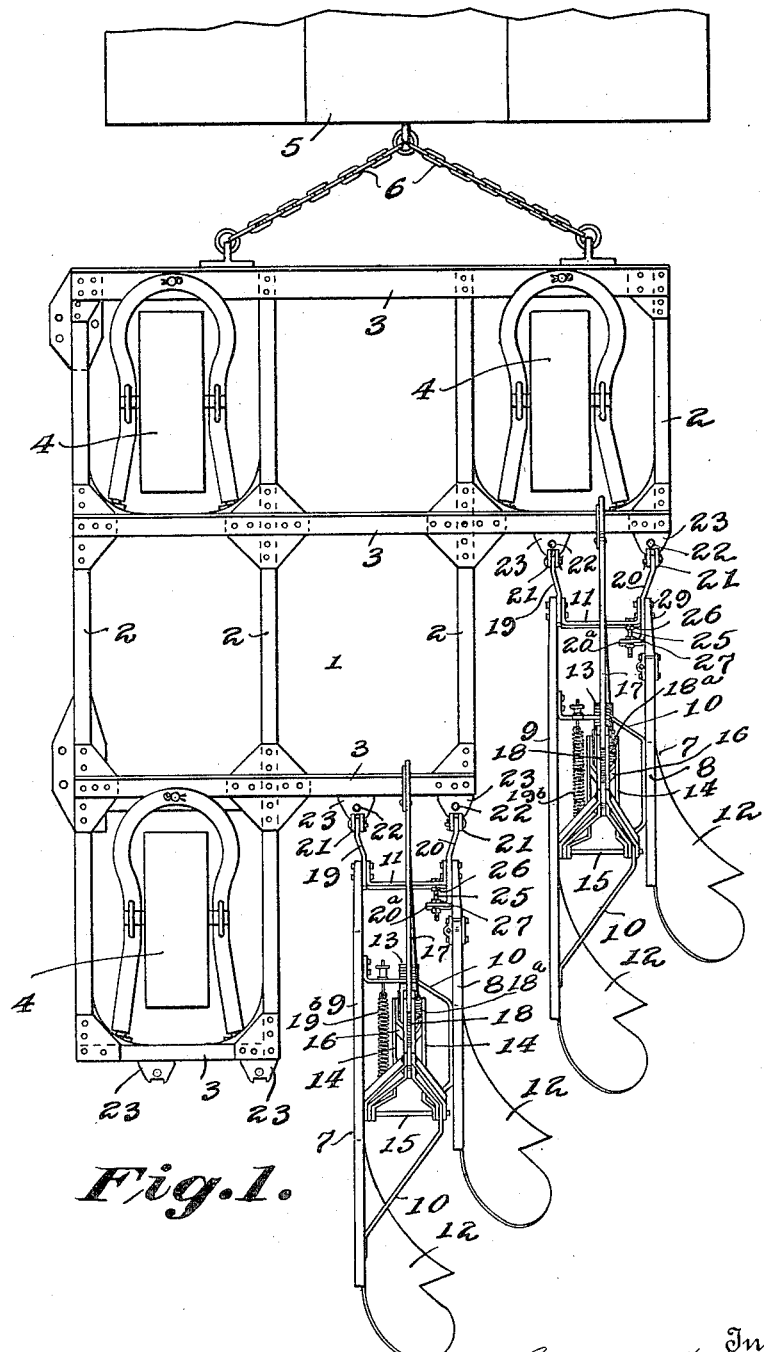

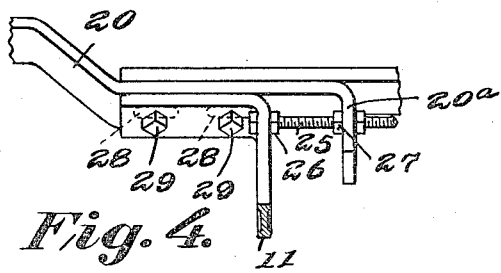
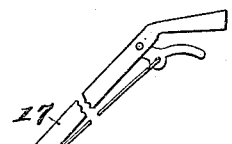
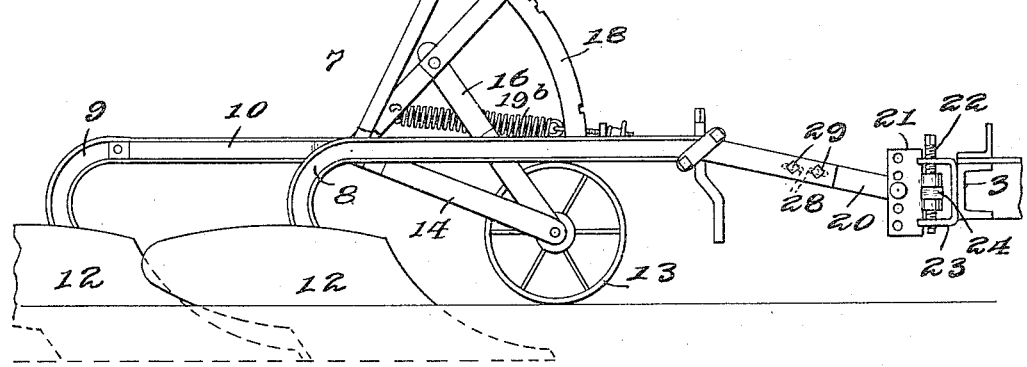
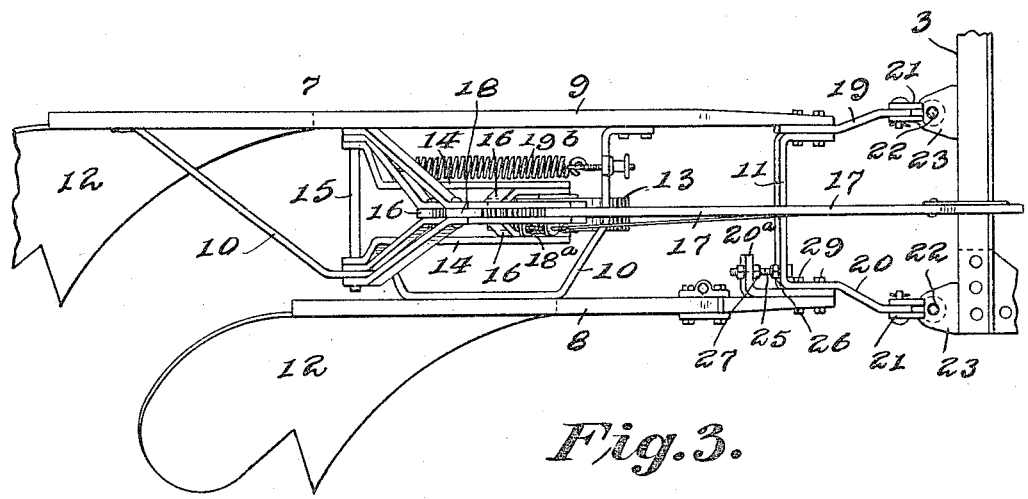

CHARLES H. MELVIN, OF MOLINE, ILLINOIS, ASSIGNOR TO DEERE & COMPANY, A CORPORATION OF ILLINOIS.

ENGINE GANG-PLOW.

1,149,074.

Specification of Letters Patent.

Patented Aug. 3, 1915.

Application filed May 15, 1909. Serial No. 496,103.

*To all whom it may concern:*

Be it known that I, CHARLES H. MELVIN, a citizen of the United States, residing at Moline, in the county of Rock Island and State of Illinois, have invented certain new and useful Improvements in Engine Gang-Plows, of which the following is a specification, reference being had herein to the accompanying drawing.

This invention relates to engine gang plows of the type in which each is provided with the following principal elements; first, a main draft frame adapted to be hitched to a tractor; second, a series of plow beams or frames each connected to the draft frame by means of a horizontal hinging device held with its axis normally fixed in relation to the ground, preferably by being mounted directly upon the draft frame itself; third, a series of plow bodies connected normally rigidly to the beams or frames to form therewith rigid plowing units, each vertically movable in a fixed path about the aforesaid vertically fixed axis. Preferably, but so far as certain features of this invention are concerned not necessarily, each plow is also provided with a series of ground-engaging supports (preferably wheels), each normally fixedly, but vertically adjustably, connected with one of the beams or frames and adapted to carry the beam and the body in normally fixed, but optionally changeable, relation to the surface of the ground.

With the several parts of the plow connected and related as above set forth, it will be clear that as the main frame advances the several plowing units will trail behind it and will follow closely the irregularities of the surface of the ground, especially when each is supported upon its own individual ground wheel. Each plow body has, for any given elevation, a fixed working angle, that is, a fixed angle between its longitudinal lines and the horizontal. Each plow body tends to suck into the ground to a normal depth which is directly related to the working angle, and the ground wheel, when present, is used either to permit plowing at the full normal depth or to support the body above the normal depth. When deeper plowing is desired the working angle must be increased to increase the normal depth; and the ground wheel if used must be adjusted accordingly.

In a plow of this character it is also essential that the plow bodies be properly leveled or "winged," that is, properly positioned angularly with respect to transverse horizontal lines. Sometimes, on account of initial inaccuracy of construction, or on account of wear, the plow bodies are so positioned in this respect that the most efficient plowing is not obtained. And it is further found that the transverse angular position must be varied somewhat as the depth of plowing is changed; one angular position is found most efficient for one depth and another angular position most efficient for another depth.

In order that the loads on the several plow bodies may be uniform, it is primarily essential that they be evenly spaced transversely to turn furrow slices of uniform widths. In a plow of this type the beams have pivots at their front ends which normally firmly hold the beams and the bodies against lateral movement. The beams are intended to hold the bodies at uniform distances apart, but they may fail to do this accurately, either because of initial inaccuracies of construction, or because of lateral distortion or deflection on account of transverse stresses, or because of adjustments made to effect winging or to change the working angle. When for any reason the bodies are unevenly spaced transversely, the loads on them vary, with the result that some of them tend to suck in deeper than others, and that some of them tend to move to the right or the left thus applying transverse stresses to the beams.

The plow bodies in plows of this type are so designed that, when properly spaced and properly leveled or winged and working at the proper angle, they normally move straight ahead parallel to the lines of draft without tending to any marked extent toward lateral movement in either direction. However, when any of the presupposed conditions are departed from, even slightly, there is a marked variation in the actions of the several plows.

The principal object of this invention is to provide in a plow of this class, in combination with means whereby the working angles of the bodies may be changed or whereby the bodies may be adjusted angularly about longitudinal axes to effect winging, means whereby the individual plow bodies may be adjusted transversely to effect uniform spacing. These three adjustments are closely related to each other, and to the vertical adjustment of the wheel to regulate the depth of plowing, for the reason that one of them cannot be made without causing or tending to cause conditions which affect the others; that is to say, any variation in the suck or any inaccuracy of winging, tends to cause the plows to move laterally to effect uneven spacing; and any uneven spacing, however caused, varies the loads on the several bodies and interferes with their natural tendency to move straight forward without exerting substantial transverse stresses.

In the plow constructed according to my invention, all of the above described adjustments can be effected, and they can be effected in any desired relation to each other. The operator can initially adjust the bodies to secure uniform transverse spacing; and he can then level or wing the bodies to cause them to plow efficiently and without exerting transverse stresses, or he can vary the working angles in accordance with the desired depth of plowing. Obviously any turning of the bodies about longitudinal axes will affect the transverse spacing, and, when the pivotal axes of the plowing units vary somewhat from the horizontal, the adjustment of the bodies to different plowing depths will also affect the transverse spacing; any variation in the spacing resulting from either or both of these adjustments can be easily corrected.

In the preferred construction, which I show and describe, the adjusting devices are so constructed and arranged that the adjustments can be effected without breaking the connections between the main frame and the individual plows. The exact result of any adjustment can be determined only by experiment during actual plowing. In a plow embodying my invention, the operator can watch the work of the several plow bodies and can then make the required adjustments without separating or detaching any of the operative parts.

In the accompanying drawings, Figure 1 is a plan view of an implement embodying my improvements. Fig. 2 is a side elevation of one of the individual plow frames which, in the construction shown, carries two plow bodies. Fig. 3 is a plan view of the said individual plow frame, and Fig. 4 is a fragmentary detail view showing on an enlarged scale my improved adjusting device.

In the construction shown, 1 designates the main plow frame as an entirety. This frame, as shown, is made up of a series of longitudinal bars 2, 2 and a series of transverse bars 3, 3, all of which are rigidly secured together by bolts or rivets. This frame is supported by ground wheels 4, 4, one of which is preferably located in each of the three corners of the frame. These wheels are of the castering type. As the present invention does not relate specifically to the construction of the frame and of its supporting wheels, a detailed description of these parts need not be given, it being understood that they can be varied widely without departing from my invention.

5 designates the rear end of a traction engine to which the plow frame 1 is connected by chains 6.

To each of the off-set parts formed on the rear side of the frame is connected one of a series of individual plow units which are designated as entireties by 7. Each of these individual units has a beam or frame consisting of side bars 8 and 9, which are rigidly connected in parallel relation by means of a heavy bar 10, which has its ends bolted to the bar 9 and is bent so as to bring its middle part adjacent the bar 8, to which the said middle part is bolted. The front ends of the bars 8 and 9 are united by a cross bar 11. Each of the bars carries a plow body 12. It will be understood that many of the matters incident to the present improvements can be employed where units are used each having but a single body, and where the frame, or beam element, is a single bar, or where a compound bar narrower than that shown is used; these being matters well known to plow designers at the time of my invention. Each body 12 is secured to its beam element in such way as to be held rigidly in relation thereto when at work.

Each beam or frame is provided at its front end with a coupling or connecting device comprising arms 19 and 20 which are adapted to be received by clevis securing mechanisms. Each of these mechanisms comprises a bracket 23 bolted, or otherwise secured, to the main plow frame, and having its ends bent at right angles and perforated to receive an upright screw spindle 22. The spindle is free to turn in the bracket 23, but is held against longitudinal movement.

21 is a draft member in the form of a clevis which comprises a plate bent around the screw spindle 22. A nut 24 is mounted on the spindle 22 in an opening in the plate and is held against rotation by its engagement with the edges of the plate. The spindle 22 is squared at its upper end to receive a wrench or handle. It will be seen that by the rotation of the spindle, the clevis 21 may be adjusted up or down.

The forward extending arms 19 and 20 of the coupling devices of the individual gang beams are received between the parts of the clevis and are connected thereto by means of pins. The clevises are provided with a vertical series of holes, and the connecting pins are placed in one or another of these holes, according to the character of the plowing to be done. Thus, each individual unit has a relatively wide two-point connection with the frame which, while it permits the plow bodies to rise and fall freely, holds them firmly against side swinging.

The distance from one securing mechanism to the other is sufficiently great, and there is sufficient looseness in the fitting to permit either of the nuts 24 to be raised or lowered in relation to its companion nut to an extent sufficient to cause the turning of the beam and the body around longitudinal axial lines enough to effect the leveling of the bodies, or, if occasion requires, to "wing" them, that is, slightly turn them downward on the left hand side or the right.

So far as certain features of my present invention are concerned, the form of the supports for the rear parts of the plowing units is immaterial; and, in fact, so far as the said features are concerned, it is immaterial whether or not any supports whatever are provided. As shown in the drawings, however, each plow unit has a ground-engaging body-supporting device 13, here a rolling wheel, bearing on the ground. It is mounted upon a carrier 14 which is pivoted at 15 in relation to the body and the beam element. This wheel is optionally movable vertically and so arranged that when it is in its lowermost position, it and its carrier 14 are adapted to support the body in a position above the ground surface; and when the wheel and its carrier are in relatively higher positions, they permit the plow body to come to, and enter, the earth; and the body can enter deeper and deeper, according to the positions at which the wheel and its carrier are held. To the carrier 14 is connected a hand lever 17 extending to a point where it is accessible to the plowman standing on the platform of the frame 1. The plowman by moving the lever can vertically adjust the wheel and thereby raise or lower the plowing unit. By means of the notched segment 18 and the latch 18ª, the hand lever and the wheel can be locked in adjusted positions.

19ᵇ is a spring coöperating with the hand lever to apply force tending to move it in the direction for lifting the plowing unit.

By reason of the wide two-point connection between each individual plow frame and the main frame, the former, while free to rise and fall, is held against lateral swaying. It is clear, therefore, that the plow bodies on adjacent individual frames are maintained in definite spaced relation to each other.

The aforesaid coupling devices between the indivdiual plow beams or frames and the main draft frame also include means whereby the gangs or units can be adjusted laterally with respect to each other to effect uniform spacing. The clevis iron 20 is formed with a rear inturned extension 20ª, which has a hole to receive a threaded bolt 25. This bolt passes through a hole in the adjacent cross-bar 11 and is secured to said bar by means of a nut 26. 27, 27 are adjusting nuts on the bolt disposed one on either side of the extension 20ª of the clevis iron. This clevis iron is formed with slots 28, through which pass the securing bolts 29, 29. If it is found at any time that the individual plow gangs are unevenly spaced so that the widths of the furrows are not uniform, the frames which are out of line can be easily and quickly adjusted by means of the device described. To do this, it is only necessary to loosen the bolts 29, when, by adjusting the nuts 27, the frame can be moved in relation to the clevis iron 20 so as to swing the individual plow frame laterally in either direction. After such adjustment, the bolts 29 are tightened and the frame will then be held securely in the adjusted position.

It is to be noted that the pitches of the threads on the screws 22, 22 and on the bolt 25 are such that the respective adjusting devices are non-overhauling. There is no tendency for the parts to run or slack back when the turning forces applied to the screws or to the nuts on the bolt are removed. Each of the parts is automatically held by the threads in adjusted position, there being no absolute necessity for any supplemental locking devices. In the case of the bolt 25 the bolts 29, 29 are provided to relieve the bolt 25 from strain during operation, but it will be seen that this bolt 25 would, of itself, hold the beams against lateral swinging.

It will be clear that the devices that I have described are adapted for use in the manner before referred to. The working angle of each plow body can be changed as desired by adjusting the front ends of the unit vertically by means of the clevis securing mechanisms, and by adjusting one of these mechanisms independently of the other, the body can be leveled or winged. Whenever the spacing of the bodies is uneven, either as the result of initial inaccuracies of construction, or as a result of one or both of the aforesaid adjustments, the operator can at once move the units to make the spacing even.

What I claim is:

1. In a gang plowing mechanism, the combination of a main draft frame, a series of plowing units flexibly connected to the draft frame independently of each other for relative vertical movements, each unit comprising a plow body adjustable laterally with respect to the frame to change the distances between it and the adjacent bodies or about a longitudinal axis to effect transverse leveling, and devices for retaining each plow body in adjusted position without interfering with vertical movement.

2. In a gang plowing mechanism, the combination of a main draft frame, a series of plowing units flexibly connected to the draft frame independently of each other for relative vertical movements and normally held by the connection with the frame against relative lateral movements, each unit comprising a plow body adjustable laterally with respect to the frame to change the distances between it and the adjacent bodies or about a longitudinal axis to effect transverse leveling, and devices for retaining each plow body in adjusted position without interfering with vertical movement.

3. In a gang plow, the combination with a truck and a plurality of plows, of devices for connecting the plows to the truck, said connecting devices including means for effecting adjustment parallel to the axes of the plows to adjust the distance between the various plows, and said connecting devices also including means to adjust the plows to level them relatively to the truck and to each other.

4. In an implement of the character set forth, the combination of a main frame adapted to be hitched to a tractor, a series of individual plow frames each having a pair of spaced side bars or beams, and adjustable coupling devices flexibly connecting the side bars to the main frame and adapted to level the individual frame and to swing it laterally.

5. In an implement of the character set forth, the combination of a main frame adapted to be hitched to a tractor, a series of individual plow frames, and connections between the individual frames and the main frame adapted to hold the individual frames rigidly against lateral swinging while permitting them to rise and fall, each individual plow frame being adjustable laterally on approximate horizontal lines and also about an axis extending longitudinally of itself, whereby said frames can be properly spaced relative to each other and the plows carried thereby can be leveled.

6. In an implement of the character set forth, the combination of a main frame adapted to be hitched to a tractor, a series of individual plow frames connected to the main frame, said individual frames being held rigidly against lateral swinging while permitted to rise and fall, adjusting devices for moving the individual frames laterally, and adjusting devices for leveling the individual frames.

7. In an implement of the character set forth, the combination of a main frame adapted to be hitched to a tractor, a series of individual plow frames connected to the main frame, said individual frames being held rigidly against lateral swinging while permitted to rise and fall, non-overhauling means for adjusting each individual frame laterally, and non-overhauling means for leveling each individual frame.

8. In a gang plowing mechanism, the combination of a main draft frame, a series of individual plow beams each comprising a pair of spaced rigidly connected longitudinal side bars, plow bodies normally rigidly connected with the respective beams, means for connecting the individual beams to the draft frame for movements in fixed paths about vertically fixed transverse horizontal axes, means in connection with each individual beam adapted to adjust one of the side bars thereof longitudinally to cause a lateral swinging of the beam and body along lines substantially parallel to the axis of pivotal connection to the main frame, and means for adjusting the bodies with respect to the draft frame about longitudinal axes to level them.

9. In a gang plowing mechanism, the combination of a main draft frame, a series of individual plow beams or frames, a series of plow bodies each normally rigidly connected to one of the beams, connections between the beams and the main frame for normally holding the beams against lateral swinging while permitting them to move vertically about substantially horizontal vertically fixed transverse axes at their forward ends, devices in connection with each beam for permitting it to be moved laterally and for retaining it in adjusted position, and means independent of the aforesaid vertical movements of the beams about their axes for changing the working angles of the bodies.

10. In a gang plowing mechanism, the combination of a main draft frame, a series of individual plow beams or frames, a series of plow bodies each normally rigidly connected to one of the beams, connections between the beams and the main frame for normally holding the beams against lateral swinging while permitting them to move vertically about substantially horizontal vertically fixed transverse axes at their forward ends, adjusting devices in connection with each individual beam comprising constantly engaging counterpart elements for moving the beam laterally in either direction to regulate the transverse distances between individual plow bodies and for retaining it in adjusted position, and means independent of the aforesaid vertical movements of the beams about their axes for changing the working angles of the bodies.

11. In a plowing mechanism of the character set forth, the combination of a main draft frame mounted in fixed position relatively to the ground and adapted to be hitched to a tractor, a series of individual plow beams, a series of individual plow bodies each rigidly connected to one of the beams, connections between the beams and the draft frame adapted to normally hold the beams rigidly against lateral swinging while permitting them to rise and fall about substantially horizontal pivotal axes at their forward ends, devices in connection with each beam adapted to permit it to be moved laterally in either direction to regulate the transverse distances between bodies, means for retaining the beams in laterally adjusted positions, and adjusting devices for raising or lowering the pivotal axis of connection of each beam to the draft frame to change the working angle of the body.

12. In a plowing mechanism of the character set forth, the combination of a main frame mounted in fixed position relatively to the ground and adapted to be hitched to a tractor, a series of individual plow beams, a series of individual plow bodies each rigidly connected to one of the beams, connections between the beams and the draft frame adapted to normally hold the beams rigidly against lateral swinging while permitting them to rise and fall about substantially horizontal pivotal axes at their forward ends, adjusting devices in connection with each individual beam comprising constantly engaging counterpart elements for moving the beam laterally in either direction to regulate the transverse distances between individual plow bodies and for retaining it in adjusted position, and adjusting devices in connection with each beam for raising or lowering the pivotal axis of connection to the draft frame to change the working angle of the body and for retaining it in adjusted position.

13. In a gang plowing mechanism, the combination of a main draft frame, a series of individual plow beams or frames, a series of plow bodies each normally rigidly connected to one of the beams, connections between the beams and the main frame for normally holding the beams against lateral swinging while permitting them to move vertically about substantially horizontal vertically fixed transverse axes at their forward ends, a permanently connected train of devices in connection with each beam adapted while so connected for moving the corresponding body laterally, and another permanently connected train of devices in connection with each beam adapted while so connected for changing the working angle of the plow.

14. In a gang plowing mechanism, the combination of a main draft frame, a series of individual plow beams or frames, a series of plow bodies each normally rigidly connected to one of the beams, connections between the beams and the main frame for normally holding the beams against lateral swinging while permitting them to move vertically about substantially horizontal vertically fixed transverse axes at their forward ends, devices in connection with each beam for permitting it to be moved laterally and for retaining it in adjusted position, and devices operable independently of the aforesaid vertical movements of the beams about their axes for changing the working angles of the plows and for adjusting the bodies angularly about longitudinally axes to effect winging.

15. In a gang plowing mechanism, the combination of a main draft frame, a series of individual plow beams or frames, a series of plow bodies each normally rigidly connected to one of the beams, connections between the beams and the main frame for normally holding the beams against lateral swinging while permitting them to move vertically about substantially horizontal vertically fixed transverse axes at their forward ends, adjusting devices in connection with each individual beam comprising constantly engaging counterpart elements for moving the beam laterally in either direction to regulate the transverse distances between individual plow bodies and for retaining it in adjusted position, and devices operable independently of the aforesaid vertical movements of the beams about their axes for changing the working angles of the plows and for adjusting the bodies angularly about longitudinal axes to effect winging.

16. In a gang plowing mechanism, the combination of a main draft frame, a series of individual plow beams, a series of individual plow bodies each rigidly connected to one of the plow beams, connections between the beams and the draft frame adapted to normally hold the beams rigidly against lateral swinging while permitting them to rise and fall about substantially horizontal vertically fixed pivotal axes at their forward ends, devices in connection with each beam adapted to permit it to be adjusted laterally in either direction to regulate the transverse distances between bodies, means for retaining the beam in laterally adjusted positions, and adjusting devices in connection with each beam for moving it about an axis extending longitudinally of itself to effect winging of the plows and for raising or lowering the pivotal axis of connection to the main frame to change the working angle of the plow body.

In testimony whereof I affix my signature, in presence of two witnesses.

CHARLES H. MELVIN.

Witnesses:
Eugene L. Taylor,
Roy E. Anderson.